United States Patent
Arning

(10) Patent No.: US 7,827,059 B2
(45) Date of Patent: Nov. 2, 2010

(54) SYSTEM AND METHOD FOR REWARDING A USER'S INTERACTION BEHAVIOR WITH A COMPUTER SYSTEM

(75) Inventor: Andreas Arning, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 2894 days.

(21) Appl. No.: 10/034,973

(22) Filed: Dec. 20, 2001

(65) Prior Publication Data

US 2003/0120542 A1 Jun. 26, 2003

(30) Foreign Application Priority Data

Dec. 23, 2000 (EP) .................................. 00128500

(51) Int. Cl.
*G06Q 30/00* (2006.01)
(52) U.S. Cl. .................................................. 705/14.35
(58) Field of Classification Search ..................... 705/14
See application file for complete search history.

(56) References Cited

U.S. PATENT DOCUMENTS 6,321,256 B1 * 11/2001 Himmel et al. ............. 709/218
6,381,632 B1 * 4/2002 Lowell ........................ 709/203
6,383,078 B1 * 5/2002 Yacenda ....................... 463/41
2003/0105663 A1 * 6/2003 Steinman et al. .............. 705/14

FOREIGN PATENT DOCUMENTS

WO    WO 01/70359    *    3/2000

OTHER PUBLICATIONS

David Reilly, "Java Network Programming FAQ", Apr. 2000, http://www.davidreilly.com/java/java_network_programming.*

* cited by examiner

*Primary Examiner*—John Van Bramer
(74) *Attorney, Agent, or Firm*—Law Office of Jim Boice

(57) ABSTRACT

A technique for rewarding a user's interaction behavior in a computer network environment, such as the Internet. A reward is provided for following a hyperlink in a first document to a second document and then returning to the original document again. The reward can be provided in terms of (positively priced) information or payment in the form of bonus points or cash payment or access to computerized services and the like. The required information to effect the reward is stored in databases. The invention provides motivation for the user to definitely and intentionally return to the original document, rather than being lost to the owner of the original document as the user visits other web sites after visiting the second document.

3 Claims, 7 Drawing Sheets

SYSTEM AND METHOD FOR REWARDING A USER'S INTERACTION BEHAVIOR WITH A COMPUTER SYSTEM

BACKGROUND OF THE INVENTION

1. Field of the Invention

This invention relates to electronic commerce. More particularly, this invention relates to a technique for providing rewards in accordance to a user's interaction behavior with a computer system. One possible area of exploitation with the present invention is the area of advertising within interactive systems like the Internet.

2. Description of the Related Art

With the increasing popularity of the Internet and the World Wide Web, it has become common to set up web sites for advertising, marketing, selling goods and services as well as providing product and other information and customer services. Examples for such web sites are online stores for books, computers and other goods, web sites providing information on the stock market, travel information or weather reports, search engines and access to databases. The commercial value and the stock market value of such web sites are usually proportional to the number of visitors per time interval.

A problem commonly faced by on-line advertisers and merchants is an inability to efficiently attract potential consumers to their web sites. One way of attracting consumers has been to market the site through television, newspaper and other conventional channels.

However, advertising a site using conventional methods can be expensive, and can consume significant human resources. In addition, it is often difficult or impossible to evaluate the effectiveness of a given advertisement.

"Banner" ads are an advertisement method commonly used on web pages on the Internet. If the user clicks on a banner, this has typically the effect that the web browser program automatically connects to the web site with the URL corresponding to the banner advertisement. From this new site, the user will typical follow other links to other web sites. From the viewpoint of the owner of the original site, the user risks "getting lost" in the Internet and not coming back to the original site on which the banner advertisement is placed. This problem may even discourage the owner of the original web page to integrate such banner ads from third parties or at least be very restrictive with respect to the selection and inclusion of deviating links in the site.

In U.S. Pat. No. 5,794,210, an attention brokerage system is provided which provides compensation to users for paying attention to an advertisement or other "negatively priced" information distributed over the Internet. Attention brokerage is the business of buying and selling the attention of consumers. In its simplest form, negative pricing is a passive competition among advertisers for consumer attention in which advertisers make fixed offers to users for their selection. A special icon or other symbol displayed on a computer screen may represent compensation and allow users to choose whether they will view other negatively priced information and receive associated compensation. Targeting users may be provided by reference to a database of digitally stored demographic profiles of potential users. Information can be routed to users based on demographics, and software agents can be used to actively seek out users on a digital network. One of the drawbacks of this prior art system is that it requires an intermediate agent, i.e., an attention broker computer and registration of both users and advertisers with the attention broker computer.

In U.S. Pat. No. 6,141,010, a computer interface method and apparatus with targeted advertising based upon demographics and user interaction are described. Associated with each banner advertisement is a set of data that is used by the software application in determining when a particular banner is to be displayed.

U.S. Pat. No. 5,960,411 describes a method and system for placing a purchase order via a communications network. The order is placed by a purchaser at a client system and received by a server system. A server system receives purchaser information including identification of the purchaser, payment information and shipment information from the client system. The server system then assigns a client identifier to the client system and associates the assigned client identifier with the received purchaser information. The server system sends the assigned client identifier to client system and an html document identifying the item and including an order button. The clients system receives and stores the assigned identifier by means of a so-called "cookie".

SUMMARY OF THE INVENTION

A principal object of the present invention is to provide a computer system as well as a computer program, and a method for rewarding a user's interaction behavior such that an incentive is provided to the user who follows a hyperlink in a first document to a second document and then intentionally returns to the original document. In brief, when the user is offered a hyperlink to go to another document, this typically implies a risk that the user will "get lost" by following subsequent other hyperlinks. This problem is addressed by the invention by offering and providing the user with a reward as an incentive to return to the original document after having visited the second document linked to by the hyperlink. With this technology, a personal incentive is created for the user to definitely return from the deviating document.

For instance, by applying the proposed technology to the Internet, the invention enables a company to direct their customers to another company's web site while minimizing the risk that its own customers will not come back to the company's web site or "get lost" in the Internet.

There can be many reasons for a company to suggest deviating hyperlinks to its customers and provide such links in its web sites. One reason to include hyperlinks to other web sites is to provide added value and customer service to the customer. For example, a law firm typically includes hyperlinks to other legal sites to allow their clients to download legal documents like legal texts and patents. If a client follows such a hyperlink, it is desirable that the client comes back to the original web site of the law firm after the download.

Another common reason to provide a hyperlink to another web site is to suggest that the user download an additional program, plug-in or the like that the user can employ to better view the web site of the company. Again, it is desirable that the user returns to company's web site after having loaded and installed the additional computer program from the remote web site.

Still another reason for a company to include links to other web sites in its own web site is to generate income by allowing others to place banner advertisement on the company's web site. This is most important for a company whose business model is entirely based on income from advertisements, like web portals and search engine web sites. To help enhance its customer relationship and enhance customer loyalty, it is helpful to offer reward to a user to return to the company's web site after having clicked on a banner advertisement or other hyperlink.

Further, the present invention allows a company to provide a reward to a user in exchange for the user viewing "negatively priced" information without prior agreement or consent of the provider of the negatively priced information. If the company can show to the provider of the negatively priced information that a significant number of users view the negatively priced information by following a corresponding hyperlink from its web site, this can be a basis for the company to negotiate in retrospect an agreement with the provider of the negatively priced information because the company continuously increases the value of the provider of the negatively priced information by directing its users to the corresponding hyperlink.

The reward provided to the user can be of various types. One way to reward the user is to provide "positively priced" information to the user or information which may otherwise be of interest to the user, such as stock market data, weather reports, music, video, graphics or program files. Alternatively, the user is offered bonus points for purchase of the company's goods or receives direct cash payments to the user's credit card account.

Yet another way of rewarding a user is to offer other computer-based services to the user not available otherwise; or, if available, for which otherwise the user would have to pay for.

BRIEF DESCRIPTION OF THE DRAWINGS

The present invention together with the above and other objects advantages may best be understood from the following detailed description of the preferred embodiments of the invention illustrated in the drawings, wherein.

DESCRIPTION OF THE PREFERRED EMBODIMENT

Figure 1:
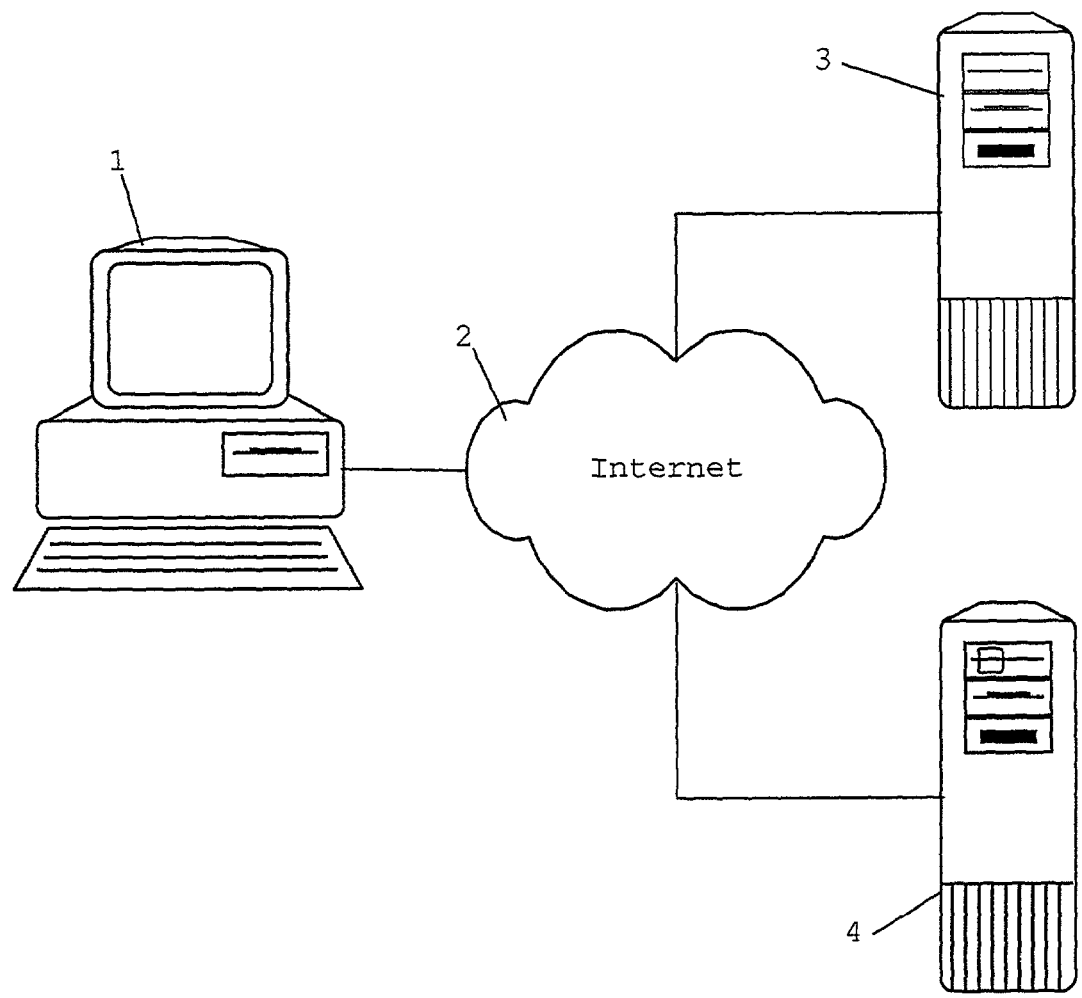
FIG. 1.

In the drawings and specification, a preferred embodiment of the invention is set forth and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when being loaded in a computer system, is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; and/or b) reproduction in a different material form.

Even though the current invention is described within the context of the Internet and the corresponding World Wide Web, this description is for a descriptive purposes only and may not be understood as a limitation of the applicability and scope of protection of the current technology. Also within the following description, the notion of a document is used as an abstract concept of some type of entity comprising a hyperlink which allows a user to navigate to another entity. These entities may represent real documents, pages on a computer system like Web pages, or some objects and the like.

While the following description will outline the current invention based on a client computer used by the user to access these documents (interconnected by hyperlinks) residing on the same or different server computers, this distribution aspect is not essential for the current invention. In one "extreme" embodiment of the current invention, there might not exist any distributed data processing environment and all the documents are hosted directly by the computer system used by the user.

GLOSSARY OF TERMS AND ACRONYMS

The following terms and acronyms are used throughout the detailed description:

1. Client-Server: A model of interaction in a distributed system in which a program at one site sends a request to a program at another site and waits for a response. The requesting program is called the "client", and the program which responds to the request is called the "server". In the context of the World Wide Web (discussed below), the client is a "Web browser" (or simply "browser") which runs on a computer of a user, and the program which responds to browser requests by serving Web pages is commonly referred to as a "Web server".
2. Hyperlink: A navigational link from one document to another, or from one portion (or component) of a document to another. Typically, a hyperlink is displayed as a highlighted word or phrase that can be selected by clicking on it using a mouse to jump to the associated document or documented portion.
3. Hypertext System: A computer-based informational system in which documents (and possibly other types of data entities) are linked together via hyperlinks to form a user-navigable "web".
4. Internet: A collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.
5. World Wide Web ("Web"): Used herein to refer generally to both (i) a distributed collection of interlinked, user viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

6. Web Site: A computer system that serves informational content over a network using the standard protocols of the World Wide Web. Typically, a Web site corresponds to a particular Internet domain name, such as "IBM.com", and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

7. HTML (Hyper Text Markup Language): A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from Web server to a browser, the codes are interpreted by the browser and used to parse and display the document. Additionally, in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc. 1995 (ISBN 0471-11894-4).

8. HTTP (Hyper Text Transport Protocol): The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document of file located at the specified URL.

9. Java: A portable language for building of highly distributable applications or applets. An applet can be accessed over the Internet. It is self-contained in that it carries its own presentation and processing code and can run on whatever type of computer which imports it. Applets are being used as "plug-in" units that form part of a larger application. Java is a trademark of Sun Microsystems, Inc.

10. URL (Uniform Resource Locator): A unique address which fully specifies the location of a file or other resource on the Internet. The general format of a URL is protocol:// machine address:port/path/filename. The port specification is optional, and if none is entered by the user, the browser defaults to the standard port for whatever service is specified as the protocol.

11. Cookies: A technology that enables a Web server to retrieve information from a user's computer that reveals prior browsing activities of the user. The informational item stored on the user's computer (typically on the hard drive) is commonly referred to as a "cookie". Many standard Web browsers support the use of cookies.

12. Push Technology: An information dissemination technology used to send data to users over a network. This contrasts with the World Wide Web, which is a pull technology, in which the client browser must request a Web page before it is sent. Push protocols send the informational content to the user computer automatically, typically based on information or settings prespecified by the user.

FIG. 1 shows a preferred embodiment of a computer system for providing rewards to a user. The computer system has a client computer 1, which can be a standard personal computer using the Windows operating system. Windows is a registered trademark of Microsoft Corp. The client computer 1 can be linked to other client computers in a company network, such as an Intranet or LAN, or it can be a stand-alone personal computer. The client computer 1 has a web browser program to allow a user to access the Internet 2. Further, the computer system has server computers 3 and 4 which are also connected to the Internet 2. The server computer 3 and the server computer 4 host different web sites. The user of the client computer 1 can access the web sites of the server computers 3 and 4 by inputting the appropriate URL into its web browser. By using the TCP/IP and HTTP standard protocols, the web browser can download web documents from the respective web site.

Figure 2:
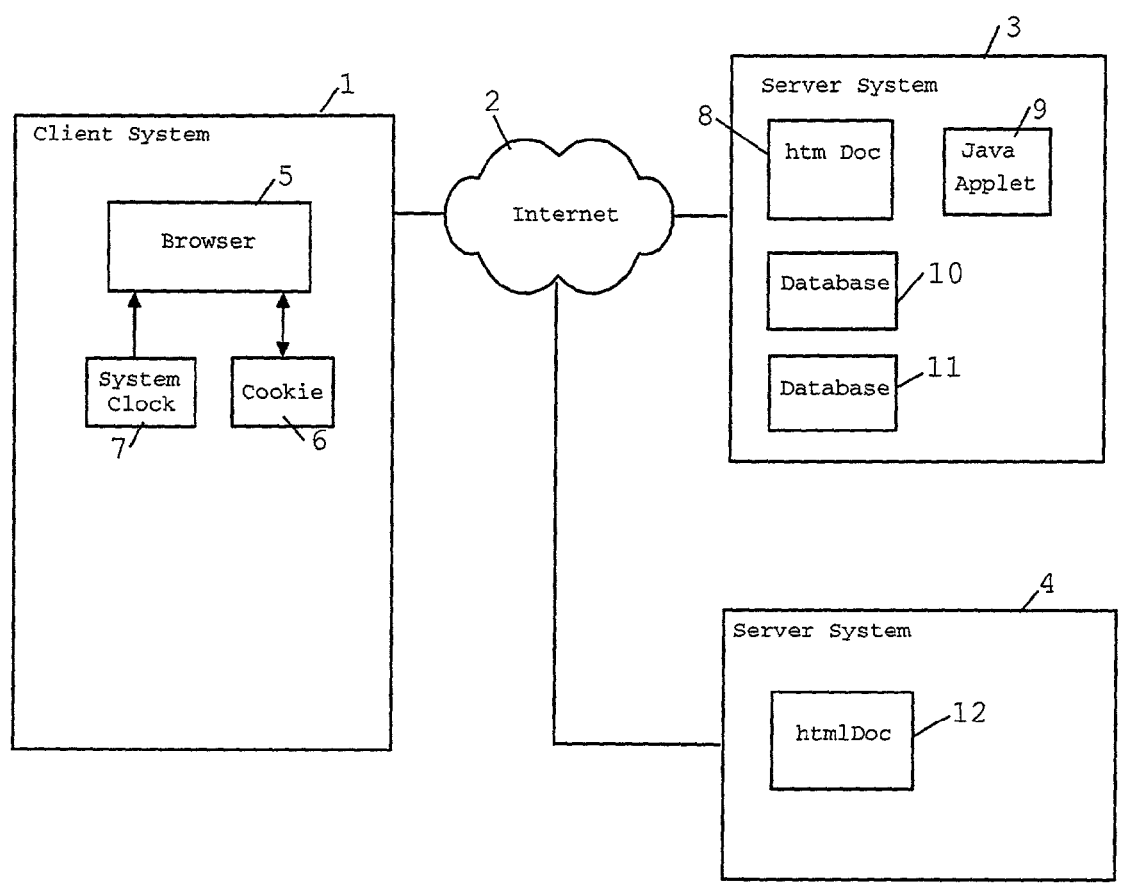
FIG. 2 are block diagram representations illustrating a computer system, comprising a clients system and service systems, for implementing a method for providing reward to a user.

FIG. 2 shows a more detailed view of the system of FIG. 1. In FIG. 2, the same reference numerals are used to designate the same elements as shown in FIG. 1. The client system 1 has a browser 5 which can create a cookie 6. The cookie 6 typically is stored on non-volatile memory of the client system 1, such as the hard disk of the client system 1. Further, the client system 1 has a system clock 7 which is visible to the browser 5.

The server system 3 stores a web document 8 which is associated with a Java applet 9. Further, the server system 3 has a database 10 for storing, for instance, positively priced information, such as stock market data, travel and weather related data or music and video files. In general, the database 10 comprises information the user might be interested in, independent of whether it is priced or not. This data and files are transferable from the server computer 3 to the Internet 2 in response to a "pull" request from a browser or a push operation performed by the server system 3.

Further, the server system 3 has a database 11 for storing user profiles. The user profiles can be used to provide a user-specific reward to a user in the form of bonus points or by making cash payments to the user's credit card account. Each user profile stored in the database 11 is retrievable from the database 11 based on a unique user ID assigned to each particular user. The user profile can encompass the user's credit card account, shipping address, billing address, e-mail address, telephone number as well as a history file containing data of the user's interests, demographic information and/or prior purchases and/or downloads performed by the user.

The server system 4 also contains a web document 12 which can be downloaded by the client system 1 via the browser 5 and the Internet 2. The web document 8 has a hyperlink to the web document 12 on server system 4.

Figure 3:
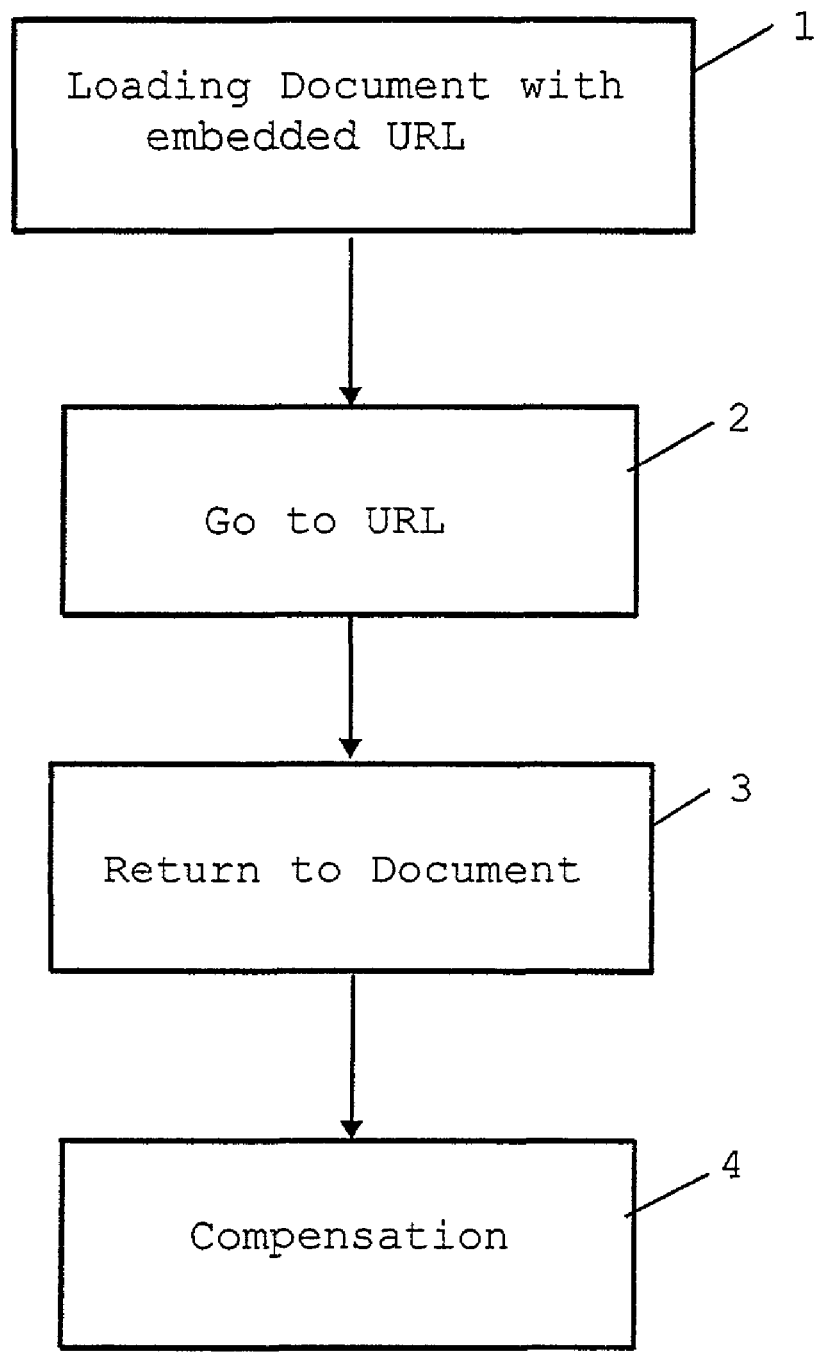
FIG. 3 is a flow chart of a preferred embodiment of the present invention.

FIG. 3 illustrates the operation of a computer system depicted in FIG. 2. In Step 1, the user of the client system 1 enters the address of the web site of server system 3 having the web document 8. The web document 8, together with its associated Java applet 9, is loaded from the server system 3 to the browser 5 of the client system 1 through the Internet 2. The Java applet 9 is started automatically on the client system 1 and the corresponding application program is executed by the processor of the client system 1. The web document 8 contains a hyperlink to the web document 12 on server system 4, which is visible to the user when the web document 8 is displayed via the browser 5.

The hyperlink can be shown to the user of the client system 1 by displaying the URL of the hyperlink or by showing a graphic object or banner advertisement which points to the URL of the web document 12, or by some other technical means. The web document 8 contains an offer to the user of the client system 1 to the effect that when the user follows the hyperlink to the web document 12 and returns to the original web site of the web document 8 on the server system 3, the user will get a reward. That is, the reward will be distributed only after returning within the context of the original document 8 to create a significant personal interest or incentive on the part of the user to "actively" and intentionally return to the original document.

The offered reward can be of various kinds. For example, the reward may consist of positively priced information for which a user would normally have to pay or other information of potential interest to the user. If the user desires to accept the offer, he or she clicks on the hyperlink so that the web document 12 is downloaded from the server 4 to the browser 5 over the Internet 2. This is done in Step 2.

When the user clicks on the deviating URL contained in the web document 8 to branch to the second document (thus implicitly accepting the offer), the Java applet 9 is invoked to read the system time by accessing the system clock 7. The Java applet 9 and/or the browser 5 create a cookie 6 for storing the system time when the user clicks on the URL, banner ad, etc. for the second web document 12 on the client system 1. Alternatively, this can also be realized by making usage of JavaScript. Additionally, "JSP" (Java Server Pages) or "ASP" (Active Server Pages) can be used.

In Step 3, the user returns to the original web document 8 from the web document 12 by clicking on the return button of the browser 5, clicking on a return link, entering the URL for the first document 8 in the browser 5, etc. This again invokes Java applet 9 to read the present system time from the system clock 7 and to read the previously stored system time from the cookie 6. The time difference between the actual system time and the previously stored system time indicates the time which the user spends on web document 12. It is advantageous to provide the reward to the user of client system 1 only if the user spends a certain minimum amount of time with the web document 12, as this increases the probability that the user really "perceived" the information provided with the second document 12.

This is a measure to prevent the frivolous usage of computer programs simulating input operations of a human user in order to make frequent usage of the offer contained in the web document 8 to obtain the reward. Such computer programs are detrimental to the owner of the web site of the web document 8 because the offered reward is only intended for a human user who has actually visited the web site of the web document 12 and perceived its contents.

It is pointed out that the proposed invention is independent from the concrete technique of returning to the original web document (the deviating document) 8. Instead of clicking the return button, it also would be possible to explicitly enter the URL of the original document into the browser or selecting the URL in the history file of the browser.

If reward is only paid under the condition that a certain minimum time was spent on the web site of the web document 12, this does not make impossible the frivolous use of such computer programs, but it makes it less attractive because the maximum frequency of getting a reward is limited by the time threshold. For example, the threshold value for the minimum amount of time the user has to spend on the web document 12 in order to get reward can be set to one minute. It is most advantageous to set the times threshold to a value being characteristic to the specific web document, or in other words, to set the time threshold to a time value required by a typical user to read and understand information provided in the web document 12.

On the other hand, it is desirable for the owner of the web site of the web document 8 that the user does not spend too much time at the remote web site of the linked web document 12. This is why setting a second maximum threshold value is advantageous. In this case, a reward is only provided to the user if he or she returns to the original web document 8 within a period of time which is shorter than the second threshold value (but greater than the first value).

The Java applet 9 accordingly compares the actual amount of time the user spends on the web document 12 with both threshold values. If the amount of time is in between the threshold values, a request is automatically issued by the Java applet 9 and the browser 5 over the Internet 2 to the server system 3 to provide the offered and accepted reward to the user of the client system 1. This is done in Step 4.

A reward, for instance in the form of positively priced information or other information or access to computer-based services of interest for a user, is outputted from the database 10 over the Internet 2 to the browser 5. Alternatively, a plurality of options concerning the kind of reward can be offered to the user of the client system before the concrete request to access the reward is made. For example, the user can select from a variety of music and/or video files or select certain data of interests to the user. Or even more advanced, a user might choose a general computerized service he/she would like to access as reward. In this case, the user's selection is integrated into the reward request and used to retrieve the desired information from the database 10 before it is provided to the browser 5. Sending the positively priced information from the server system 3 can be done by using push or pull technology.

Of course, it would also be possible to provide, upon return to the original document, not a single reward but a collection of rewards from which a user is allowed to actually select a certain one, only depending on his preferences.

Alternatively, bonus points or cash payments can be made as a reward for the user. In this case, prior registration of the user is necessary. In the registration process, the user is assigned a user ID which serves to retrieve user profile information from the database 11. The user ID is also stored by means of a cookie 6 in the client system 1. When a request for reward in the form of bonus points or cash payment is made, the Java applet 9 reads the user ID from the cookie 6 and sends it to the server system 3 together with the reward request. The user ID allows retrieval of the user profile stored in the database 11 and thus access to the bonus account or credit card account of the user in order to transfer the bonus points or cash, respectively.

In a preferred embodiment, the server system 3 has a counter to count the number of reward requests, because this information is representative of the number of users who actually visited the web site of the web document 12. This information is important to prove the increase in value of the web site of the web document 12, which is accomplished by hits which come from the web site of the web document 8. This information is important for the owner or operator of the web site of the web document 8 to negotiate a reward for this value increase with the owner of the web site of the web document 12. Thus, the proposed technology permits measurement of the attractiveness of the second document due to its accessibility based on the hyperlink from the first document.

Further, it is advantageous to include a statistics module in the server system 3 for statistical analysis of user profiles of users who select the link for the web document 12. This information can be of interest to both operators of the web documents 8 and 12 and/or can be sold to third parties.

Figure 4:
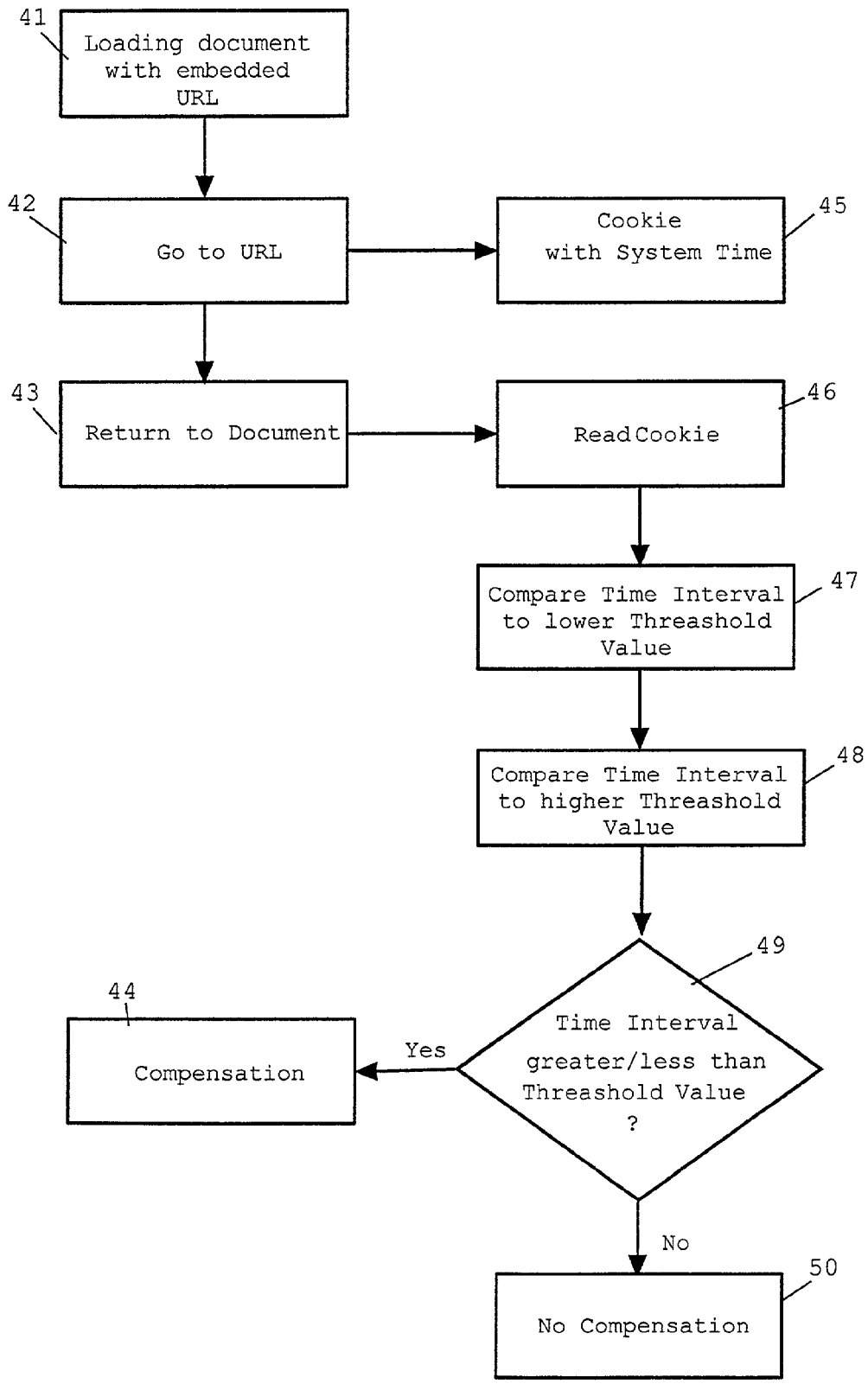
FIG. 4 is a flow chart of a further preferred embodiment of the present invention.

FIG. 4 shows a further preferred embodiment of the method of the invention. In Step 41, the web document 8 is loaded by the browser 5, the web document 8 containing a URL (link) to the web document 12. In Step 42, the user clicks on the URL to access the web document 12. In response to this user action, the cookie 6 is created which stores the current system time. This is done in Step 45.

After some time, the user returns to the original web document 8 in Step 43, e.g., by making usage of the "back-button" of the browser 5. Alternatively, other methods can be used to return to the original web document 8, e.g., typing in the URL of the page 8 explicitly, or using the browser's bookmark technique. When the user returns, the cookie 6 is read in Step 46. At the same time, the present system time is determined by the accessing system clock 7. The duration of the time interval the user spent away from the web site of the web document 8 is thereby determined.

This time interval is compared with a lower threshold value in Step 47. In Step 48, the time interval is compared to a higher threshold value. In Step 49, it is decided whether the time interval is greater than the lower threshold value and lesser than the higher threshold value. If the time interval is in the range as defined by the lower and higher threshold values, a reward is provided to the user in Step 44. If the time interval does not fall within the range, no reward is provided and a corresponding explanatory message may be provided to the user in Step 50.

Figure 5:
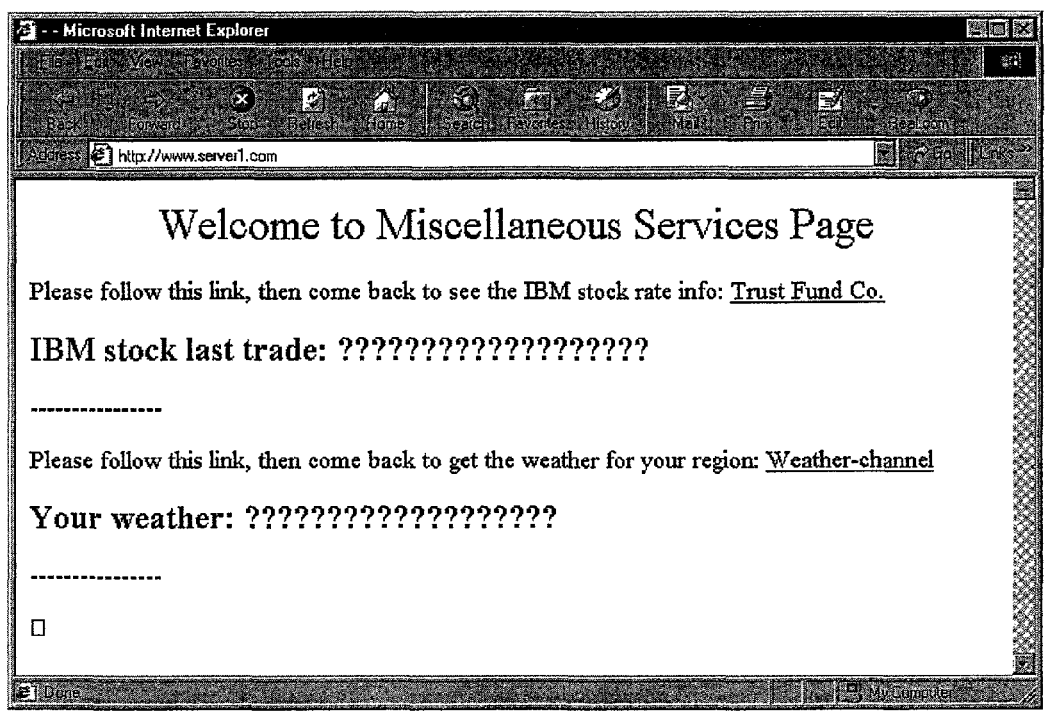
FIG. 5 to FIG. 7 represent an illustrative example of an application of the present invention.
Figure 6:
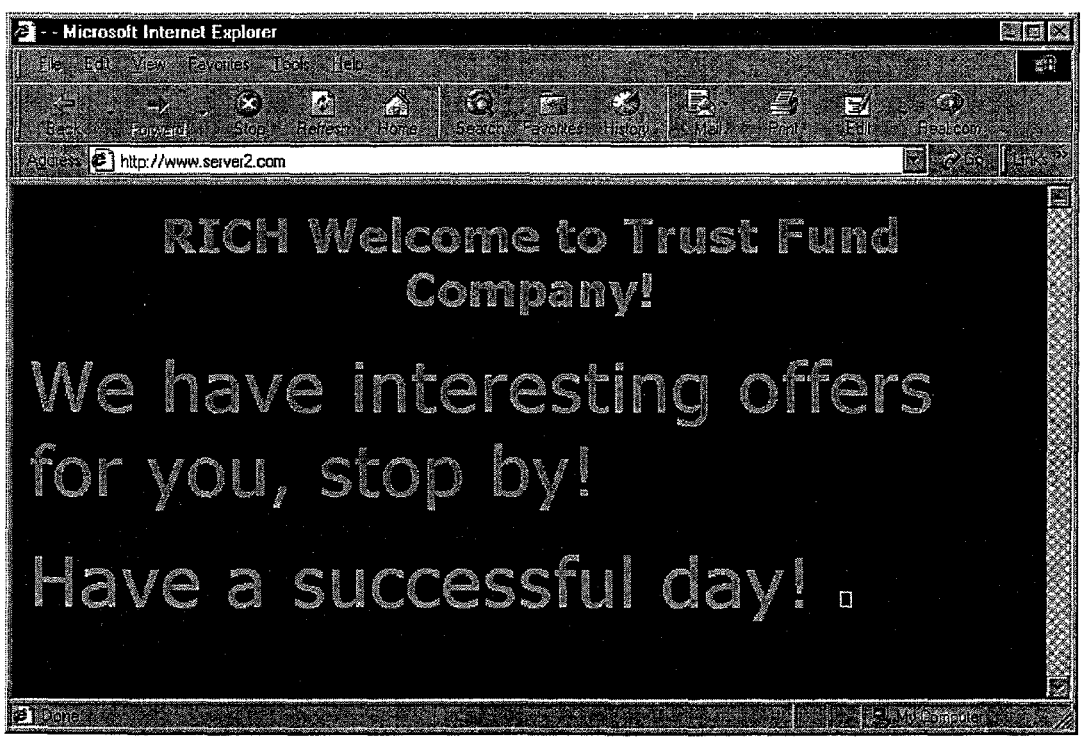
Figure 7:
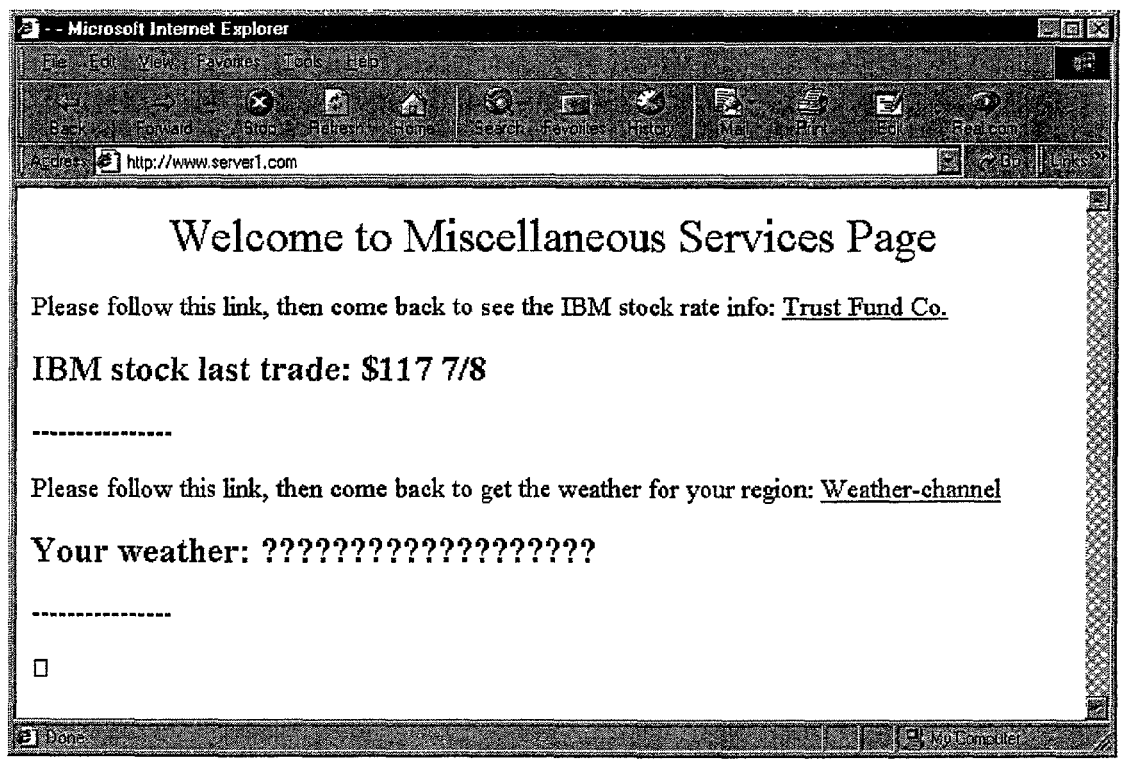

FIG. 5 to. FIG. 7 show an example of the application on an embodiment of the invention. FIG. 5 depicts the web site www.server1.com of a web portal named "miscellaneous services page". This web site is accessed by the user of the client system 1 through its browser 5. The corresponding web document as depicted in FIG. 5 contains a hyperlink to "Trust Fund Co." and a hyperlink to the "Weather Channel". For the first hyperlink, the reward offered to the user is the current stock price of IBM stock, and for the second hyperlink, the reward offered to the user is the weather forecast in the region where the user resides. If the user clicks on the hyperlink "Trust Fund Co.", the browser 5 connects to www.server2.com as shown in FIG. 6. After some time, the user goes back to the original web site www.server1.com, e.g., by clicking the browser's back button. When this action occurs, a reward is requested for the user in form of the current value of the IBM stock and is displayed to the user as depicted in FIG. 7.

If the user had followed the "weather channel" hyperlink, the user's profile information stored in database 10, in particular his or her address, serves to access the weather forecast information of the corresponding region, which is provided as a reward to the user.

In the previous examples, the first and the second documents resided on different computer systems belonging to different owners. The next example relates to a situation wherein both documents reside on the same computer system and even belong to the same owner. Suppose a software company offers various software products governed by different license conditions. Let's assume that for a first set of software products the public is well informed about the relating license conditions. In addition, a second set of software products could be offered by that software company for which very specific license conditions exist. For instance, the second set of software products could be experimental in nature, and the company is licensing these products under different terms, such as different warranty clauses within the license agreement.

With this background, a first document could offer the first set of software products for download right away as a reward. An informational element within this first document could indicate that additional, more experimental software products are available as a reward, but which are governed by a separate license agreement. A hyperlink is comprised within the first document allowing navigation to a second document comprising this separate license agreement. As reward for following this hyperlink, the first document promises to make the second set of (experimental) software products available for download in addition within the first document after returning from the second document. Due to the more complicated subject matter of the license agreement, the time thresholds discussed above are set to larger values to enforce that user is actually studying these licensing conditions thoroughly. Based on the current invention, a user who spent enough time studying the specific license agreement would be rewarded on return to the first document by an enhanced list of downloadable software products comprising the first and second set of software products of that company.

The invention claimed is:

1. In a computing environment, a system for providing a reward to a user of the Internet for desired web site visiting behavior, said system comprising:

means located at a first server for loading a first web document over the Internet to a user's computer, said first web document having a hyperlink to a different server for a second web document;

means for monitoring at the first server whether said user selects said hyperlink to navigate to said second web document;

means at said first server responsive to a detection for monitoring whether said user returns to said first document;

means at said first server for providing a reward to said user in response to the user returning to the first web document from the second web document;

means for starting a timer in response to the user selecting the hyperlink in the first web document;

means for stopping the timer when the user returns to the first web document and determining a timer value; and means for comparing the timer value to a first and a second threshold value, wherein, the reward is provided to the user only if the tinier value is greater than the first threshold value and smaller than the second threshold value.

2. Computer readable code loaded memory for execution on a computer, for providing a reward to a user of the Internet for desired web site visiting behavior, said code comprising:

first subprocesses for loading a first web document from a first server over the internet to a user's computer, said first web document having a hyperlink to a second web document located at a second server connected by the internet to the user's computer and the first server;

second subprocesses for monitoring whether said user selects the hyperlink to navigate to said second web document;

third subprocesses for monitoring whether said user returns to receive said fast document from said first server;

fourth subprocesses for providing a reward to said user over the internet from the first server in response to the user returning to the first web document from the second web document;

fifth subprocesses for starting a timer in response to the user selecting the hyperlink in the first web document;

sixth subprocesses for stopping the timer when the user returns to the first web document and determining a timer value; and seventh subprocesses for comparing the timer value to a first and a second, threshold value, wherein the reward is provided to the user only if the timer value is greater than the first threshold value and smaller than the second threshold value.

3. A computerized method to provide a reward to a user interacting with a computer network, said method comprising the steps of:

loading a first document from a first server over the internet onto a network access device of the user in response to a user request to download the first document received at the first server over the computer network, the first document having a hyperlink to a second document on a second server connected to the computer network;

determining whether said user selects the hyperlink and navigates to receive said second document over the computer network from the second server;

determining whether said user returns to said first document;

providing a reward to said user after said user returns to said first document, if it is determined that the user has returned to the first document, determining an amount of time for the user spent by the user before returning to the first document; and the network access device comparing the amount of time to a first threshold value and a second threshold value; and providing the reward only if the amount of time is greater than the first threshold value and smaller than the second threshold value.

* * * * *